United States Patent

O'Grady

[15] 3,639,118

[45] Feb. 1, 1972

[54] PROCESS FOR PURIFYING MERCURY

[72] Inventor: Austin O'Grady, Sarnia, Ontario, Canada

[73] Assignee: The Dow Chemical Company, Midland, Mich.

[22] Filed: May 22, 1970

[21] Appl. No.: 39,891

[52] U.S. Cl. ................................75/121, 75/112, 75/114, 204/140
[51] Int. Cl. ......................................................C22b 43/00
[58] Field of Search......................75/121, 81, 112, 114, 101; 204/140

[56] References Cited

UNITED STATES PATENTS

| | | | |
|---|---|---|---|
| 690,361 | 12/1901 | Currie | 75/114 |
| 1,707,471 | 4/1929 | De Remer | 75/121 |
| 2,845,344 | 7/1958 | Sakowski | 75/81 |
| 3,113,018 | 12/1963 | Young | 75/97 |
| 3,437,476 | 4/1969 | Dotson et al. | 75/121 X |

*Primary Examiner*—Hyland Bizot
*Assistant Examiner*—G. T. Ozaki
*Attorney*—Griswold and Burdick, William R. Norris and L. S. Jowanovitz

[57] ABSTRACT

Mercury is purified with regard to iron, calcium and similar metallic impurities by contacting the mercury with "nascent" chlorine and with an aqueous phase capable of generating nascent chlorine. The contact step may be carried out, for example, by electrolyzing a chloride brine which is in contact with the mercury; or by washing the mercury with a mineral acid and the metal salt of an oxychloride acid. Impurity metal values are solubilized into the aqueous phase which is separated from the mercury. The process generally involves only two steps (i.e., contacting and separating), is easy to perform, and can be carried out within a relatively few minutes.

9 Claims, No Drawings

3,639,118

PROCESS FOR PURIFYING MERCURY

BACKGROUND OF THE INVENTION

A great many uses of mercury depend upon the liquid characteristics of the metal. Production of chlorine by means of a flowing mercury cathode exemplifies such uses. All too frequently, the liquid characteristics of mercury are impaired by contamination with various metallic impurities such as iron and calcium.

Various processes have been developed for purifying mercury. Canadian Pat. No. 565,709 describes treating mercury with acidified ammonium salts. In U.S. Pat. No. 3,364,128, treatment with a nitric acid oxidizer in combination with electrolytic means is described. French Pat. No. 993,646 also describes the use of electrolytic means in treating mercury. Where the major contaminant is iron, with little or no calcium or other iron-displacing metal present, purification is accomplished rather expeditiously simply by washing the mercury with a dilute mineral acid.

Major advantages of the instant invention, and objects thereof, are to provide a relatively quick and simple mercury purification process generally involving only two unit operations. An additional advantage of the invention is that mercury containing iron is purified, even though impurities such as calcium or other iron-displacing impurities are present.

SUMMARY OF THE INVENTION

In the invention, mercury is purified by contacting the mercury with an aqueous phase containing chemically combined chlorine, and generating chlorine from the aqueous phase while the phase is in the presence of the mercury. The mercury is subsequently separated from the aqueous phase.

For optimum results, it is essential in this invention that the impure mercury be contacted with nascent chlorine. This is accomplished by generating chlorine in close proximity or in the presence of the mercury. Several methods have been developed to obtain the desired contact. Most conveniently, a mineral acid and an oxychloride salt e.g., sodium hypochlorite) are reacted in the presence of the mercury. The mercury can also be electrolyzed while in contact with a chloride brine, with the mercury serving as the anode. Other methods that do not involve nascent chlorine, i.e., contacting the mercury with an aqueous solution of chlorine such as a solution of hypochlorous acid or an aqueous solution of chlorine and hydrogen chloride are less efficient.

From about 0.1 to about 0.5 parts per million (p.p.m.) of nascent chlorine are employed for each p.p.m. of impurity metal values present in the mercury. Preferably, from about 0.2 to about 0.4 p.p.m. of nascent chlorine are employed for each p.p.m. of impurity metal values.

As the mercury is contacted with the nascent chlorine, the impurity metal values are solubilized into the brine or aqueous reaction medium used to generate the chlorine. After the desired period of contact with nascent chlorine is completed, the mercury is separated from the aqueous chlorine generating phase. Frequently the mercury is also washed with water after separation from the chlorine generating phase or simultaneously with separation. Washing is desirable to remove oxidizing species from the mercury.

The length of time during which the mercury remains exposed to the nascent chlorine depends largely on the amount of impurities present in the mercury and the degree of purity desired. As the period of contact with the chlorine-generating system is increased, the purity of mercury produced by this invention is increased. However, as contact time is increased, loss of mercury through oxidation is also increased and the advantages of purity tend to be outweighed by mercury losses. Generally, if the mercury is treated with at least 0.1 p.p.m. of nascent chlorine for each p.p.m. of impurity metal values present therein, the appropriate contact time of the mercury with the chlorine generating system is at least 1 minute and is generally from about 3 to about 5 minutes. Such contact times are sufficient to accomplish at least a 90 percent reduction in impurities after the mercury is washed. Contact times in excess of 5 minutes are also within the scope of the invention. For example, contact times of up to 10 minutes or more can be employed. However, at such long contact times, mercury losses are increased.

Where nascent chlorine is produced by reacting a mineral acid and oxychloride salt in the presence of the mercury, from about one to about two equivalents of salt are employed for every equivalent of acid. The term equivalent refers to the amount of acid required to produce one mole of hydrogen ions (assuming 100 percent ionization,) and the amount of oxychloride salt which will provide one mole of alkali metal or ammonium ions. Preferably, for most efficient utilization of reagents, about stoichiometric quantities of the acid and salt are reacted, i.e., the ratio (in equivalents) of oxychloride salt to mineral acid is about one. Suitable mineral acids are hydrochloric acid, nitric acid, or sulphuric acid. Suitable salts are the ammonium or alkali metal salts of oxychloride acids, e.g., sodium hypochlorite, sodium chlorite, or sodium perchlorate.

A convenient method for reacting a mineral acid and oxychloride salt in the presence of mercury is to admix the mercury (with agitation) with aqueous solutions of the salt and acid. The mercury should be admixed before the aqueous solutions of salt and acid are contacted with one another. The concentration of the acid solution is from about 20 to about 37 percent by weight. The concentration of the salt solution is from about 5 to about 40 percent by weight. The amount of each solution employed should be sufficient to satisfy the above-described ratios of equivalents. During admixing and reaction to produce chlorine, it is preferred that the admixture of aqueous salt and acid solutions with the mercury be agitated to increase the amount of mercury exposed to the nascent chlorine.

The mercury can also be contacted with nascent chlorine produced by electrolysis of a brine (e.g., a NaCl brine) which is in contact with the mercury. In the electrolysis, the mercury to be purified serves as the anodic electrode. The brine serves as electrolyte. The cathode is graphite but can also be a noble metal of the platinum group e.g., platinum) or a deposit of noble metal on titanium. Conveniently, the electrolysis is performed in an electrolytic mercury cell normally used for the production of chlorine.

Generally, the current density produced in the cell will depend on the concentration of the brine electrolyte, speed of reaction desired, and the amount of impurities in the mercury. Current density in the cell should be sufficient to produce about 1 p.p.m. of nascent chlorine for each 2 to 6 p.p.m. of impurity metal present, within a reasonably short time, such as from about 5 to about 15 minutes. For example, where the brine is concentrated sodium chloride, and the impurities are from about 2,000 to about 5,000 p.p.m. of iron and from about 200 to about 600 p.p.m. of calcium, current densities of from about 0.015 to about 0.030 a. cm.$^{-2}$ will allow at least 90 percent of the impurity metal values to be removed when the electrolyzed mercury is contacted with water.

Following contacting with nascent chlorine produced as described above, the mercury is separated from the chlorine-generating system, e.g., the brine electrolyte or aqueous reaction mixture of mineral acid and oxychloride salt. After separation or simultaneously therewith, the mercury may be washed with water. Dilute saline solutions may also be employed to wash the mercury.

The term "washing" as used herein refers to any of a variety of operations employed to obtain contact between mercury and water. For example, the mercury can be contacted with water in countercurrent fashion, or admixed with water in an agitated bath. The mercury can be passed through water under the force of gravity and collected as the bottom phase in a two-phase system.

Generally, 1 volume of mercury is contacted with at least 10 volumes of water. Smaller amounts of water are employed if less efficient removal of impurities can be tolerated. Where the initial concentration of impurities in the mercury is from about 2,000 to about 5,000 p.p.m. each volume of mercury is preferably contacted with from about 5 to about 10 volumes of water.

PREFERRED EMBODIMENT OF THE INVENTION

The invention enjoys its greatest utility when employed to eliminate the problem of mercury "butter" frequently encountered in large chlorine cells which use flowing mercury electrodes. As the mercury circulates through the cell and contacts metallic portions thereof such as the bedplate, which is made of iron and steel, impurities such as iron are solubilized into the mercury. As the concentration of impurities in the mercury builds up, the viscosity of the mercury decreases. Eventually the mercury may become so impure that it obtains a consistency similar to that of butter, hence the name "mercury butter." A typical analysis in a cell heavily contaminated with mercury butter is from 1 to 700 p.p.m. calcium and from 1 to 17,000 p.p.m. iron. Typically, the mercury butter contains from 200 to 300 p.p.m. of calcium and from 2,000 to 5,000 p.p.m. iron. The iron may be present either as metallic iron or as iron oxides. If iron is the only major impurity present, the mercury may be freed of impurities (and regain its desirable liquid qualities) simply by washing the mercury with dilute mineral acid. However, if impurities such as calcium are present, the simple acid treatment is not effective in removing the iron. Other impurities which act similarly to calcium in hindering iron removal by acid washing are strontium, copper, manganese, nickel, titanium, molybdenum, vanadium and zinc.

In the preferred embodiment of the invention, mercury butter, i.e., mercury containing at least 2,000 p.p.m. of iron and at least 200 p.p.m. of calcium or a similar impurity (as specified above,) is contacted with nascent chlorine. Small amounts (i.e., 160 p.p.m.) of other impurities such as molybdenum may also be present in the mercury butter. The contacted mercury may be washed with water if desired. Any of the methods set forth above are suitable for contacting the mercury and nascent chlorine or washing the mercury with water. Due to simplicity and convenience of operation, the preferred method is to admix the mercury butter with dilute aqueous solutions of mineral acid and an oxychloride salt as described above. For example, each gram of mercury butter can be admixed with from about 5 to about 6 g. of a concentrated aqueous solution of hydrochloric acid and from about 50 to about 55 g. of an 11 weight percent solution of sodium hypochlorite.

A reduction in impurity concentration of at least 90 fold is normally obtained. The percent recovery of mercury, i.e., the amount of purified mercury obtained in relation to the amount of mercury contained in the mercury butter processed, is from about 91 to about 99 percent.

While the invention is generally carried out using water to wash the mercury subsequent to contacting with nascent chlorine, it would also be possible to wash the mercury with aqueous solutions such as dilute saline solutions.

The following examples are set forth to illustrate the invention:

EXAMPLE 1

Forty-one grams of mercury butter containing 2,225 p.p.m. iron present mainly as iron amalgam and $Fe_3O_4$, and 372 p.p.m. calcium present mainly as calcium amalgam and calcium hydroxide were shaken with 50 ml. of sodium hypochlorite solution (containing 11 percent by weight of NaOCl) and 5 ml. concentrated hydrochloric acid (containing 37 percent by weight of acid) at room temperature for 3 minutes. On settling and separating the lower layer, a reduction in iron and calcium contents to 225 p.p.m. and 22 p.p.m., respectively, resulted. The yield of mercury was 39.4 g.

In another experiment, 15 g. of mercury butter containing 1,695 p.p.m. iron and 240 p.p.m. calcium were shaken for 3 minutes with 20 ml. concentrated hydrochloric acid saturated with chlorine. On settling and separating the lower layer, reductions in iron and calcium levels to 720 p.p.m. and 100 p.p.m., respectively, resulted. The yield of recovered Hg was 14 g. The decreased reduction in impurity levels illustrates the need for contacting the mercury with nascent chlorine.

EXAMPLE 2

Following substantially the same process as in Example 1, 60.2 grams mercury butter containing 16,000 p.p.m. iron and 2,200 p.p.m. calcium were subjected to two treatments with 50 ml. sodium hypochlorite (containing 11 weight percent of NaOCl) and 5 ml. concentrated hydrochloric acid. A yield of 55.8 g. of "liquid" mercury was obtained and a reduction in iron and calcium content to 1,450 p.p.m. and 40 p.p.m., respectively.

EXAMPLE 3

In a further experiment, 55 g. of mercury butter containing 2,225 p.p.m. iron and 372 p.p.m. calcium were subjected to six treatments with 50 ml. sodium hypochlorite (containing 11 percent NaOCl) and 5 ml. of concentrated hydrochloric acid. A yield of 50 g. of mercury was obtained wherein the iron and calcium contents were 180 p.p.m. and 30 p.p.m., respectively.

As a comparative example, 42 g. of mercury butter containing 14,100 p.p.m. iron and 215 p.p.m. calcium were shaken with 5 g. HCl and 15 g. ammonium chloride in 100 g. water for 3 minutes. A yield of 42 g. of mercury was obtained. Little, if any, reduction in viscosity was observed. A reduction in iron and calcium content to 14,000 p.p.m. and 80 p.p.m., respectively, was noted.

EXAMPLE 4

One hundred and twenty grams of feed brine (26.6% NaCl pH≈2) were electrolyzed at 70° C., with 218.4 g. of mercury butter containing 2,800 p.p.m. iron and 240 p.p.m. calcium. An electromotive force of 12 volt, 2½ a. was applied between the electrodes for 10 minutes. A considerable reduction in viscosity was noted and the yield was 211.2 g. The iron and calcium contents of the mercury were 100 p.p.m. and 13 p.p.m., respectively.

EXAMPLE 5

124.7 g. of feed brine were electrolyzed at 70° C., with 122.9 g. mercury butter as anode and a platinum cathode. The mercury butter contained 4,500 p.p.m. iron and 660 p.p.m. calcium. An electromotive force of 6 volts, 5 a. was applied between the electrodes for 13 minutes. The mercury was rendered mobile and the yield was 120 g. The iron and calcium contents were reduced to 300 p.p.m. and 130 p.p.m., respectively.

EXAMPLE 6

Eighty-one end boxes in a mercury cell plant were treated consecutively with 1,000 to 2,000 milliliters of sodium hypochlorite (containing 11 percent NaOCl and 100 to 200 ml. of concentrated hydrochloric acid during the cell flushing operation. The contact time was from 1 to 5 minutes. The mercury was subsequently separated from the hypochlorite solution and was flushed with water. Virtually all the iron and calcium were solubilized into the hypochlorite solution and the mercury was rendered pure enough to be recycled.

A typical analysis on an end box containing mercury butter with 4,350 p.p.m., iron and 200 p.p.m. calcium contacted with 2,000 ml. sodium hypochlorite and 250 ml. of concentrated hydrochloric acid. After about 5 minutes, the aqueous phase was separated from the mercury. The mercury contained 3 p.p.m. iron and 4 p.p.m. calcium.

What is claimed is:

1. A process for purifying mercury comprising: (a) contacting mercury with an aqueous phase containing chemically combined chlorine, (b) generating chlorine from the aqueous phase thereby to contact the mercury with nascent chlorine, and (c) separating the mercury from the aqueous phase.

2. A process as in claim 1 wherein the mercury is contacted with from about 0.1 to about 0.5 parts per million of nascent chlorine for every part per million of impurity metal values present therein.

3. A process as in claim 2 wherein the mercury is contacted with from about 0.2 to about 0.4 p.p.m. of nascent chlorine for every part per million of impurity metal values present in the mercury.

4. A process as in claim 1 and including the step of washing the mercury with water.

5. A process as in claim 1 wherein the mercury is contacted simultaneously with an aqueous solution of mineral acid and an aqueous solution of an ammonium or alkali metal oxychloride salt.

6. A process as in claim 5 where from about one to about two equivalents of salt are employed for each equivalent of acid.

7. A process as in claim 5 where the acid is hydrochloric acid and the salt is sodium hypochlorite.

8. A process as in claim 1 wherein the mercury is contacted with a chloride brine and the brine is electrolyzed with the mercury serving as the anode.

9. A process as in claim 8 wherein the current density is from about 0.015 to about 0.030 a. cm.$^{-2}$, and the contact time is from about 5 to about 15 minutes.

* * * * *